Nov. 21, 1944.     I. L. WOLK ET AL     2,363,274

CATALYTIC PROCESS AND APPARATUS

Filed May 24, 1943

INVENTORS.
I. L. WOLK
J. D. UPHAM
BY
*Hudson, Young, + Yinger*
ATTORNEYS.

Patented Nov. 21, 1944

2,363,274

UNITED STATES PATENT OFFICE 2,363,274

CATALYTIC PROCESS AND APPARATUS

I. Louis Wolk and John D. Upham, Bartlesville, Okla., assignors to Phillips Petroleum Company, a corporation of Delaware Application May 24, 1943, Serial No. 488,226

10 Claims. (Cl. 196—52)

The present invention relates to conversion processes and apparatus therefor wherein a mobile catalyst is utilized. It is particularly applicable to the conversion of hydrocarbons using a powdered catalyst suspended in hydrocarbon vapors. The invention will be described with particular reference to catalytic cracking of gas oil or the like, but it is also applicable to other conversion reactions, such as hydroforming, dehydrogenation, cyclization, etc., especially endothermic conversions in which the catalyst is regenerated by the exothermic combustion of carbonaceous matter deposited thereon.

Inasmuch as cracking, dehydrogenation, etc. are endothermic reactions, the temperature of the hydrocarbon stream passing through a reaction zone generally decreases in the direction of flow, with consequent decrease in rate of reaction. In the catalyst regeneration step, the reverse occurs, that is the temperature of the regeneration gas increases in the direction of flow through the regeneration zone, with consequent overheating. Our invention serves to minimize these effects, with consequent improvement in efficiency.

The use of finely divided solid catalyst which is caused to flow through a conversion system has recently come into commercial use in the cracking or other treatment of hydrocarbon materials. In the so-called "fluid" cracking process, powdered solid cracking catalyst is suspended in hydrocarbon vapors in a cracking zone, withdrawn to a regeneration zone wherein carbon is burned off by suspension of the spent catalyst in hot oxygen-containing gases, and the regenerated catalyst then returned to the reaction zone for further use. In such processes, the catalyst is depended upon to a certain extent to act as heat carrier by transferring heat from the exothermic regeneration reaction to the endothermic cracking reaction which is generally carried out at a lower temperature. In order to effect transfer of a high percentage of the heat of regeneration to the conversion zone, a fairly high ratio of catalyst to regeneration gas and reactants is used, the amount of catalyst circulated frequently being in excess of that required for the sole purpose of catalyzing the conversion. Furthermore, the catalyst is liable to be subjected to undesirably high temperatures in the regeneration zone. Thus the excessive number of regenerations which the catalyst undergoes for a given amount of conversion, and the high temperature to which it is repeatedly subjected, serve to shorten the ultimate life of the catalyst, and force its discard as too permanently spent for further economic use after producing less product than would be the case under less severe operations. Obviously, the amount of equipment required, and utilities and other operating expenditures, are greater than is to be desired, due to the necessity of moving large volumes of catalyst.

An object of this invention is to provide improved methods and apparatus for carrying out catalyzed reactions. A further object is to provide for the utilization of heat generated in an exothermic reaction to supply heat to an endothermic reaction, utilizing direct heat exchange. Another object is to compensate for the temperature drop which normally occurs in an endothermic reaction zone. Another object is to effect endothermic hydrocarbon conversions in the presence of a mobile powdered catalyst, and to regenerate said catalyst by oxidation of carbon thereon, the while effecting transfer of heat from the regeneration to the conversion. A further object is to crack hydrocarbons by means of a so-called "fluid" catalyst while circulating a smaller amount of such catalyst than is normally used, and yet retaining advantages of the fluid-type catalyst. Still another object is to provide a means for at least partially stabilizing temperatures in the conversion and regeneration zones while effectively conserving heat. Other objects and advantages of the invention will be apparent from the accompanying disclosure and description.

Briefly, our invention accomplishes its objects by means of direct heat exchange in a novel and efficient manner, utilizing stationary heat absorptive and conductive bodies so positioned in the apparatus as to absorb heat and stabilize temperatures in a regeneration cycle and then to give up heat and likewise stabilize temperatures in a conversion cycle, said bodies being in direct contact with gases carrying the powdered catalyst suspended therein. We preferably utilize heat retaining materials having better thermal properties than the catalyst, due to higher specific heat and/or density as well as a suitably high thermal conductivity, the net effect being to provide better heat retaining and heat transfer properties than the catalyst used. Such materials are exemplified by carborundum, iron, quartz, Alundum, and other metals or refractory materials having similar properties. In some instances, such as those wherein a particularly abrasive catalyst or flow rate is used, the heat retaining bodies may desirably be fabricated from the catalytic material itself. When this is done, the surfaces of the bodies act to a certain extent to catalyze the reaction. Carbon formed thereon during conversion is burned off during regeneration. Disintegration of the surfaces of the catalytic heat retaining bodies due to abrasion or other causes merely provides make-up catalyst to the system in the form of catalytic powder, rather than introducing any foreign material into the catalyst streams. The apparatus is constructed to permit ready replacement of heat retaining units when these units wear away to appreciable extent, as in the instance just described. In any case, the heat retaining bodies remain stationary within their respective chambers, and transfer heat as described in more detail below, thus requiring only a minimum circulation of moving catalytic material.

In the preferred practice of this invention, finely divided catalyst is suspended in reactant vapors and conducted through a reaction zone at conversion temperatures and pressures. In the reaction zone the suspension of catalyst in reactants is contacted with stationary heat retaining and conductive bodies in the manner hereinafter described. These bodies have absorbed a substantial amount of heat from a preceding regeneration reaction, and are at a temperature above the conversion temperature. After the conversion has been effected, the catalyst is separated from products of reaction, and then, with or without intermediate purging as required, is suspended in a body of oxygen-containing gas in a regeneration zone at temperatures sufficiently high to at least initiate combustion of the carbon on said catalyst. Heat retaining material is positioned within the regeneration zone for the purpose of absorbing exothermic heat of combustion, which heat is subsequently imparted to the reactants in another cycle. In the regeneration zone, the heat retaining material serves to stabilize the oxidation reaction by reason of the fact that absorption of heat by the heat retainer will prevent peak temperatures from occurring. In a similar manner excessive temperature drop is avoided in the conversion zone where the reaction is endothermic since the heat retaining material supplies heat to the reaction. Only sufficient catalyst need be used to effect the desired extent of conversion.

The catalyst may be any suitable material for the particular reaction which can be utilized in finely divided form, say, of 200-400 mesh or even finer. Such catalysts as synthetic alumina-silica, bauxite, acid-treated clays such as "Super Filtrol," and the like are especially suited to catalytic cracking operations and may be readily utilized. Other catalysts suitable for cracking or other conversion reactions are well known to the art and need not be enumerated here.

In the accompanying drawing, Figure 1 shows diagrammatically in a partially cut away view one preferred arrangement of equipment suitable for practicing the invention. In Figure 1, chambers 10 and 12 are provided, containing heat retentive material in the form of elongated streamlined bodies, brick work, or concentric cylinders 14 so positioned as to form relatively narrow passageways 41 for vapors and suspended powdered catalyst therebetween. The heat carrier bodies are shown supported on structure 43, which is perforated or otherwise constructed so as to allow free flow of vapors and catalyst through the apparatus.

Conveniently, the heat retaining material is in the form of bricks, so arranged as to provide a plurality of continuous passages to permit ready flow of the catalyst suspension. In order to effect rapid and efficient heat exchange the spaces defined by the bricks should be quite narrow to permit effective heat transfer by radiation and conduction. Ordinarily spaces from about ½ inch to 2 inches in width may be used. The spacing and relative volumes of heat retaining material utilized is dependent on the density and specific heat of said material and its other thermal properties, and upon the time of contact, the temperature change to be effected, the temperatures of the streams from which heat is obtained, or to which heat is given up, and the thermal properties of the catalyst, as well as those of the hydrocarbon or other fluid passing in contact therewith. Alternative forms of arrangement of the heat retaining material are shown in Figures 2, 3, and 4, which represent horizontal cross sections of a reaction zone.

Figure 2 represents a cross section in a plane indicated by line 2—2 in Figure 1, showing heat retaining material 14 disposed in parallel planes defining narrow spaces 41.

Figure 1:
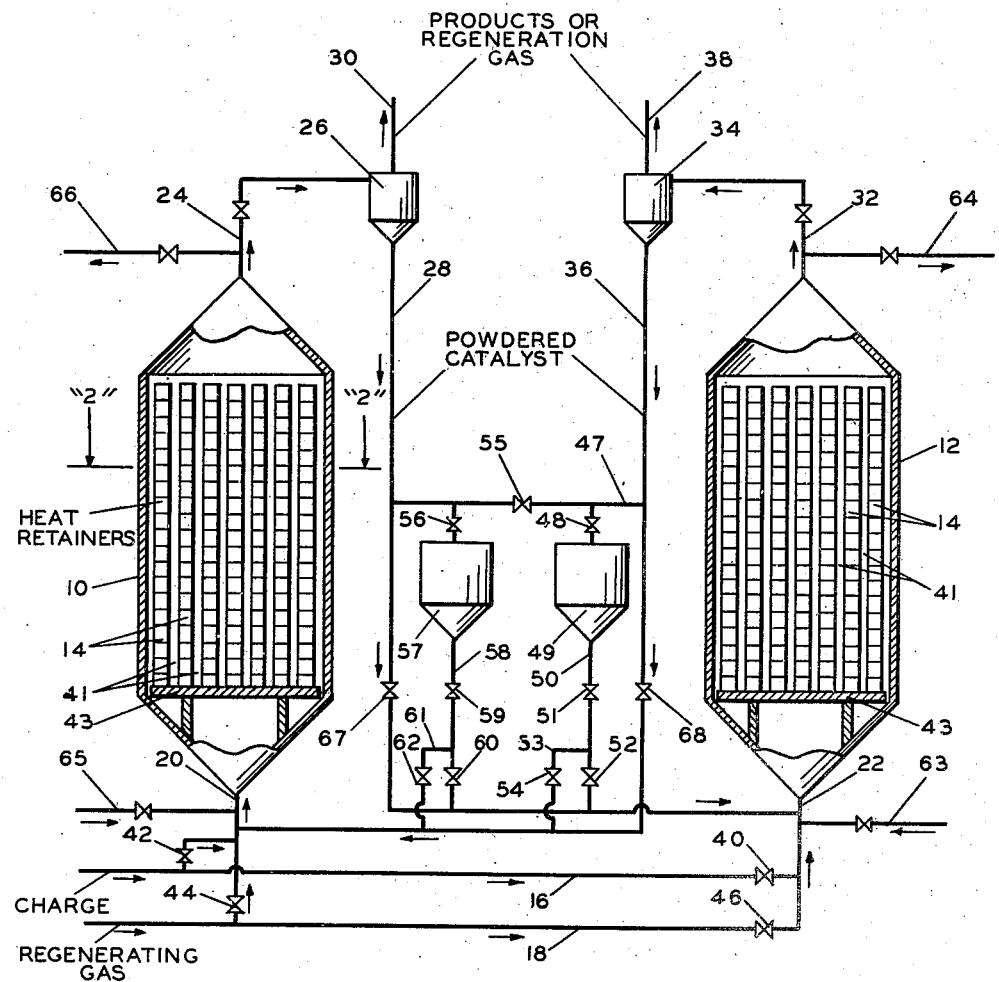

Charge, such as preheated gas oil vapor, is supplied to the system shown in Figure 1 through line 16, while regenerating gas, such as air or other oxygen-containing gas is supplied via line 18. A common inlet line 20 connecting both lines 16 and 18 with chamber 10 is provided. A similar line 22 serves chamber 12. Gases and suspended catalyst pass from line 20 through chamber 10 and then via line 24 into cyclone separator 26 or its equivalent wherein catalyst and gases are separated, the catalyst passing via line 28 and valve 67 to line 22 for introduction into chamber 12, and the gases exiting via line 30. Similarly, chamber 12 is provided with exit line 32, cyclone separator 34, catalyst line 36 containing valve 68, and gas exit line 38.

In operation, valve 40 in line 16 is closed, valve 42 is opened, valve 44 in line 20 is closed, and valve 46 in line 18 is opened. Thus catalytic cracking is effected in chamber 10, which has been previously heated in the manner hereinafter described, and catalyst regeneration is effected in chamber 12. After a limited period of operation, the heat retainers in chamber 12 are heated to an elevated temperature approaching the regeneration temperature by absorption of regeneration heat, while the heat retainers in chamber 10, which have been supplying heat for the endothermic reaction occurring therein, are cooled. In the next cycle the open valves are closed and the closed valves are opened, whereupon cracking is effected in chamber 12 and regeneration in chamber 10. This change may be controlled automatically, as through response to the temperature of either set of heat retainers, or in other suitable ways. The process continues with each chamber being alternately on stream for cracking and on stream for regeneration.

While chambers 10 and 12 are shown in vertical cross section, this is merely diagrammatic, and they may take other forms. It is particularly desired that the flow of gas containing powdered catalyst should be equitably distributed to the passageways, and that as little obstruction to the flow thereof as possible be permitted in order to avoid any substantial deposition of catalyst. A somewhat tortuous passageway may of course be provided so long as the above conditions are realized. Rather than having all of the catalyst completely suspended in gas at all times while in the chambers, a bed of powdered catalyst may be maintained in the lower part of chambers 10 and/or 12, or below these chambers, if desired, in which cases the catalyst may at least partially exit from the chambers at the bottom. Conduits may be arranged to allow flow of hydrocarbons and catalyst in one direction, and flow of regeneration gases and catalyst in another cycle in the opposite direction when the type of conversion and regeneration being carried out make such an arrangement more efficient. Various other modifications will be apparent to one skilled in the art. Obviously valves other than those shown, blowers, furnaces, controls, and other conventional equipment will be required.

In view of the fact that it is ordinarily desirable to purge the reaction zone prior to regeneration to remove residual hydrocarbons, and to purge the regeneration zone prior to conversion to remove residual oxygen-containing compounds and uncombined oxygen, such purging is provided for herein as shown in Figure 1 and described below in a preferred form.

This method and apparatus as described hereinbelow effectively permit operation of only two contact zones while at the same time enabling the purging of both zones and continuous flow of feed to the system. Charge is fed to reaction zone 10 via valve 42 and line 20. For catalytic cracking, the charge may be a gas oil which is preheated to conversion temperatures, such as 850 to 1050° F. Into the stream of hot gas oil vapors is introduced fresh or regenerated powdered catalyst via line 36. The catalyst suspension then flows through the conversion zone in which a substantial volume of the space is occupied by heat retaining material 14 arranged to define narrow spaces 41. Carborundum, due to its relatively high specific heat, good thermal conductivity, and its resistance to abrasion by the moving catalyst, is a highly desirable material, although other materials such as those specified herein may also be used. The hydrocarbon-catalyst suspension flows upward in the spaces 41 and by heat transfer with the heat retaining material, which has absorbed heat during a previous regeneration reaction, the temperature of the reactants is maintained substantially constant, or at least at a desired value, in spite of the endothermic reaction occurring. The rate of flow is suitably adjusted to the temperature and catalyst concentration to produce the desired reaction. The products of reaction containing the deactivated catalyst suspended therein are removed via line 24 and catalyst is separated in cyclone separator 26. The products of reaction are removed through line 30 and conducted to a conventional recovery system where gasoline, light gases, cycle oil, etc. are separated. Spent catalyst is removed through line 28 and conducted to regeneration zone 12 which is identical in structure to zone 10. The catalyst is reactivated in zone 12 by being suspended in a stream of oxygen-containing gas introduced via line 18, valve 46 and line 22, into which line the spent catalyst is also introduced. Regeneration is effected by combustion of carbon on the catalyst; at the same time the heat retaining material in the regeneration zone absorbs heat of reaction and serves to prevent temperature from rising to an undesired extent. The reactivated catalyst is removed through line 32 suspended in the reactivation gas and is recovered therefrom in cyclone separator 34, the oxygen-depleted gas going off via line 38. The regenerated catalyst is then returned to reaction zone 10 by means of line 36.

When the heat retaining bodies have reached the desired temperature in zone 12 and have lost a certain amount of heat in zone 10, that is, when the conversion cycle is approaching its end, the regeneration zone may be prepared for use as the reaction zone by purging therefrom any residual regeneration gas and catalyst. This is preferably accomplished in the following manner: The flow of regeneration gas is stopped for the period required for purging, which will be only a fraction of the total regeneration cycle, by closing valve 46. Valve 67 in catalyst line 28 and valve 68 in catalyst line 36 are also closed. Purge gas, which may, for example, be steam or oxygen-free combustion gas, and which is preferably preheated to about regeneration temperatures, is introduced via line 63, and removed via line 64 or via line 32, separator 34, and line 38, for the short period of time required. While this purging is occurring, flow of feed to the conversion zone continues as before, fresh or regenerated catalyst being supplied to the feed from thermally insulated reservoir 57 through line 58, valve 59, line 61, valve 62, and line 36. At the same time, spent catalyst is accumulated in thermally insulated reservoir 49 from line 28 and through line 47 and valves 55 and 48. When the reaction cycle is finished and the purging of zone 12 completed, valves 42, 55, and 62 are closed and valves 40 and 60 opened, flow of feed thereby entering zone 12 through lines 16 and 22. At the same time zone 10 is given a short purge with steam or other inert or oxygen-free gas to remove hydrocarbons and residual catalyst from the zone. Purge gas may be introduced through line 65, and removed through line 66 or through line 24, separator 26, and line 30. The effluent purge gas may be introduced, either before or after separation of catalyst, into incoming charge in line 16 by means not shown. While this purge is going on, there will be no catalyst supplied to the reaction zone through the regular channels since a regeneration zone is not functioning; therefore, during this purge cycle, catalyst is supplied to the feed from reservoir 57 via line 58, valves 59 and 60, and line 28. Spent catalyst separated in 34 is fed into reservoir 49 via lines 36 and 47 and valve 48. When the purging is completed, zone 10 is operated on regeneration cycle with oxygen-containing gas being introduced via line 18, valve 44 and line 20. Valve 48 is closed and valve 68 is opened, and spent catalyst then by-passes reservoir 49 and flows into line 20 from line 36 through valve 68. Valve 60 is closed and valve 67 is opened and regenerated catalyst flows through line 28 into line 22 and thus into zone 12. Valve 54 is now opened and spent catalyst which has accumulated in reservoir 49 during the preceding purging steps is caused to flow into line 36 and thus on into zone 10 for regeneration along with the spent catalyst from separator 34. Valve 56 is opened and reservoir 57 is replenished with regenerated catalyst from line 28 for use during the next purging steps of the cycle. Preferably the flow of spent catalyst from reservoir 49 and the flow of fresh catalyst into reservoir 57 is at the same rate, and takes place over most of the period of time between purges. During this cycle the heat retaining bodies in zone 10 are reheated and those in zone 12 impart heat to the reactants as in the previous cycle.

Purging may be effected by high velocity flow of purging gas in a period of time corresponding to five seconds to a minute or longer, depending on the length of the cracking cycle and the construction of the apparatus. Usually the period of time required for purging both zones is less than 10 per cent, and frequently less than 5 per cent of the length of one cycle. The quantity of gas used for purging may, for example, be from 2 to 10 per cent of the volume of hydrocarbon feed treated in each cycle. The purge gas is preferably at or near the temperature of the heat retainer in order to avoid excessive loss of heat. The gas may be utilized for purging a plurality of times before being discarded, or until the content of oxygen-containing materials and/or purged hydrocarbons reaches an undesirable point. In this way relatively little reheating of the purge gas is required.

While the above decription is directed to an apparatus and method which will permit continuous feed to a single pair of reaction zones, as an alternative a plurality of pairs of such zones may be provided to permit continuous feed and regeneration while another pair is being purged. Although less desirable, the zones may be purged by evacuation rather than, or in addition to, purging with an inert gas.

It is ordinarily necessary to provide for continuous purging of the deactivated and active catalyst streams obtained from the cyclone separators to remove therefrom hydrocarbons and oxygen-containing material respectively, prior to introduction thereof into the other zone. This is readily accomplished by such means as counter-current flow of steam or other methods well known to the art, which are not shown on the drawing for the sake of simplicity. It will also be understood that other conventional operation or equipment not shown may be supplied by one skilled in the art as required without departing from the invention.

Figure 2:
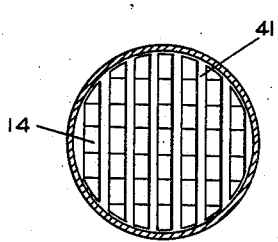
Figure 3:
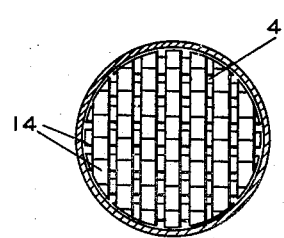
Figure 3 represents an alternative form in which the heat retaining material 14 is in the form of bricks laid on edge in rows with one set of parallel rows at right angles to another. This defines a plurality of square longitudinal channels 41.
Figure 4:
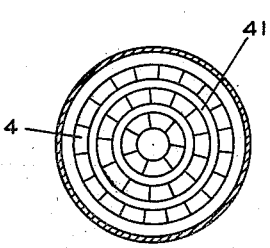
Figure 4 represents another form in which brick, metal, or other suitable material is positioned in the reaction zone in the form of concentric cylinders 14 defining narrow channels 41.

In a typical operation in accordance with the present invention, a pair of reaction-regeneration chambers is provided in an apparatus similar to Figure 1, in each of which are arranged 500 carborundum bricks, 1¼" x 4½" x 9". The bricks are arranged on edge in the manner shown in Figure 2 to define a plurality of continuous channels one inch wide, in twenty layers, each containing twenty-five bricks. A 35° A. P. I. gas oil is preheated to 925° F. and introduced into the reaction zone of the pair of the rate 175 liquid gallons per hour. Finely divided synthetic silica-alumina catalyst of 200-400 mesh is admixed with the vaporized feed in a 1 to 1 weight ratio, or at the rate of about 1200 pounds per hour. The bricks are at an average temperature of about 1,000° F. from a previous regeneration cycle and the temperature of the reactants is maintained between about 925° F. and 950° F., the heat contained in the bricks supplying the endothermic heat of cracking and sufficient excess heat to raise the temperature of the feed slightly. After a ten minute conversion cycle the feed is switched to the other chamber which has been regenerating the fluid catalyst as described above, and the catalyst is then regenerated in the chamber previously used in the conversion cycle. During each cycle catalyst is regenerated in the regeneration zone by contact with a combustion gas containing 2% oxygen. The regeneration temperature is kept between 1050° F. and 1150° F. by introduction of steam. Before the regeneration zone is switched over to conversion, it is purged with steam for about two minutes, the steam temperature being below that of the bricks; the brick temperature is lowered to about 1,000° F., which is high enough to compensate for heat lost to cracking and additionally to heat the reactants to an average temperature of about 950° F. The above operation results in a yield of about 50% of a product boiling within the motor fuel range and suitable for use as a high grade motor fuel.

Various hydrocarbon feed stocks, such as naphthas, gas oils, and the like, may be cracked in accordance with the procedure described above. In general, a cracking temperature in the range of 850-1150° F. may be used, and a catalyst to oil ratio of from about 0.2 to 10 parts by weight of catalyst per weight of oil feed is satifactory. Ordinarily, due to the presence of the heat retaining bodies, a ratio of higher than 3 to 1 is seldom required and a ratio of 1 to 1 or less is frequently satisfactory. A contact time of 5 to 50 seconds in the conversion zone is usually suitable, depending on the temperature of operation, nature of catalyst, etc. The process is preferably operated on short cycles, ranging from 2 to 15 minutes in duration. The length of cycle possible will, of course, depend on the relative volume of heat retainer, its temperature, and its thermal properties, as well as the amount of heat which must be supplied to compensate for heat of cracking or to further heat the charge. Ordinarily a mass of heat retaining material weighing from 5 to 50 times as much as the weight of oil to be converted during one cycle may be provided in each zone; this will vary in accordance with the specific heat and the conductivity of the heat retaining material. The amount of regeneration gas used will depend to a large extent on the amount of carbon deposition occurring in the reaction zone. The oxygen content of the regeneration gas may range from about one per cent on up to that of air, and normally will be well in excess of that required for complete combustion of carbon on the catalyst being regenerated.

It will be seen that the presence of the heat retaining bodies in accordance with our invention makes possible a much more rapid regeneration than would otherwise be possible, since the bodies absorb a substantial amount of the heat of reaction; the very careful and difficult control of regeneration conditions characteristic of present methods is not required when operating thus, due to the stabilizing effect of the heat retaining bodies. The same types of advantages are generally found in the reaction cycle, since by giving up a substantial portion of the heat required for cracking or other conversion the heat absorbent bodies minimize the normal drop of temperature in the reaction zone and thus greatly increase the rate of reaction.

We claim:

1. In the endothermic catalytic conversion of hydrocarbons in which finely divided catalytic material is contacted with reactants in a reaction zone, and then contacted at higher temperatures with oxygen-containing gases in an exothermic regeneration zone, the method of transferring heat from the regeneration zone to the reaction zone which comprises positioning a substantial proportion of heat retaining material within a pair of zones, regenerating deactivated catalyst in the first of said pair of zones by combustion of carbon thereon while absorbing heat of combustion by said heat retaining material therein, separating regenerated catalyst from the regenerating gas, suspending said regenerated catalyst in hydrocarbons to be converted and flowing the resulting suspension through the second of said pair of zones in contact with heated heat retaining material which has absorbed heat of combustion during a previous regeneration cycle, removing reaction products having deactivated catalyst suspended therein from said second zone, separating said deactivated catalyst and passing same to said first zone for regeneration, and switching flow of the hydrocarbon-catalyst suspension to said first zone and switching flow of regeneration gas having deactivated catalyst suspended therein to said second zone when the temperature of heat retainer in said second zone drops to an undesired level.

2. A process according to claim 1 in which a reaction zone is purged of residual hydrocarbons prior to its utilization for regeneration and a regeneration zone is purged of residual regeneration gas and products of combustion prior to its use for reaction.

3. A process according to claim 1 in which feed of reactant to a reaction zone is maintained during purging of the other zone while flowing active catalyst to said reaction zone from an active-catalyst reservoir and flowing deactivated catalyst from said reaction zone to a deactivated-catalyst reservoir.

4. A continuous process according to claim 1 further characterized by the steps of stopping the regeneration of deactivated catalyst in said first zone after a predetermined period of operation, purging said first zone of oxygen-containing material with an inert gas, maintaining feed of reactant to said second zone during purging of said first zone while flowing active catalyst to said second zone from an active-catalyst reservoir and flowing deactivated catalyst from said second zone to a deactivated-catalyst reservoir, stopping said purging and switching feed of reactant to said first zone, flowing active catalyst to said first zone from said active-catalyst reservoir, flowing deactivated catalyst from said first zone to said deactivated-catalyst reservoir, purging said second zone of residual hydrocarbons with an inert gas, stopping said purging of said second zone, stopping flow of active catalyst from said active-catalyst reservoir and flow of deactivated catalyst to said deactivated-catalyst reservoir, passing deactivated catalyst separated from effluents of said first zone to said second zone for suspension in regeneration gas, separating regenerated catalyst from said second zone and passing same to said first zone for suspension in reactants, and during the ensuing cycle regenerating deactivated catalyst from said deactivated-catalyst reservoir in said second zone and replenishing said active-catalyst reservoir with regenerated catalyst separated from said second zone.

5. Apparatus for the endothermic fluid catalytic conversion of hydrocarbons and exothermic regeneration of catalyst utilized therein which comprises a pair of chambers, heat retaining material occupying a substantial proportion of the volume of said chambers while defining passages for the flow of reactants therethrough, means for introducing a suspension of finely divided active catalyst in said hydrocarbons into one of said chambers in which the heat retaining material is at a desired temperature, means for withdrawing a suspension of deactivated catalyst in reaction products from said chamber, means for separating said reaction products and said deactivated catalyst, means for introducing a suspension of said deactivated catalyst in oxygen-containing regenerating gas for the combustion of carbon deposited thereon into the other of said chambers under combustion conditions of temperature whereby heat liberated is absorbed by heat retaining material positioned in said chamber, means for withdrawing a suspension of active catalyst in regeneration gas from said other chamber, means for separating said catalyst from said regeneration gas, means for flowing said active catalyst into said one chamber along with said hydrocarbons, means for discontinuing flow of hydrocarbons and active catalyst to said one chamber when the temperature of heat retaining material drops below a predetermined value and for flowing thereof to said other chamber, and means coordinated with said last named means for flowing regenerating gas and deactivated catalyst to said first chamber.

6. Apparatus according to claim 5 including means for introducing and removing purging gas into and from both of said chambers, an active-catalyst reservoir for delivering catalyst to hydrocarbons being reacted while a chamber is being purged before and after regeneration therein, a deactivated-catalyst reservoir for receiving deactivated catalyst separated from the reaction mixture while said chamber is being purged, and means for supplying said active-catalyst reservoir with active catalyst and for regenerating deactivated catalyst from said deactivated-catalyst reservoir.

7. A process according to claim 1 in which said heat retaining material is of the same composition as said catalyst and in the form of bodies of substantially larger size than the particles of said catalyst.

8. A process according to claim 1 in which said heat retaining material has substantially the same thermal properties as carborundum.

9. A process according to claim 1 in which said conversion is a cracking of hydrocarbons.

10. In the endothermic catalytic conversion of hydrocarbons in which divided solid catalytic material is contacted with reactants in a reaction zone, and then contacted at higher temperatures with oxygen-containing gases in an exothermic regeneration zone, the method of transferring heat from the regeneration zone to the reaction zone which comprises positioning a substantial proportion of heat retaining material within a pair of zones, regenerating deactivated catalyst in the first of said pair of zones by combustion of carbon thereon while absorbing heat of combustion by said heat retaining material therein, separating regenerated catalyst from the regenerating gas, contacting said regenerated catalyst with hydrocarbons to be converted in the second of said pair of zones in contact with heated heat retaining material which has absorbed heat of combustion during a previous regeneration cycle, separating deactivated catalyst from said second zone and passing same to said first zone for regeneration, and switching flow of hydrocarbon and active catalyst to said first zone and switching flow of regeneration gas and deactivated catalyst to said second zone when the temperature of heat retainer in said second zone drops to an undesired level.

I. LOUIS WOLK.
JOHN D. UPHAM.